US010805169B2

(12) United States Patent
    Zheng et al.

(10) Patent No.: US 10,805,169 B2
(45) Date of Patent: Oct. 13, 2020

(54) TOPOLOGY DETERMINING METHOD, MESSAGE RESPONSE METHOD, CONTROLLER, AND SWITCH

(71) Applicant: Huawei Technologies Co., Ltd., Shenzhen, Guangdong (CN)

(72) Inventors: Xiuli Zheng, Beijing (CN); Jiao Wang, Munich (DE)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 104 days.

(21) Appl. No.: 16/234,009

(22) Filed: Dec. 27, 2018

(65) Prior Publication Data

US 2019/0132210 A1    May 2, 2019

Related U.S. Application Data

(63) Continuation of application No. PCT/CN2017/077120, filed on Mar. 17, 2017.

(30) Foreign Application Priority Data

Jun. 30, 2016   (CN) .......................... 2016 1 0503105

(51) Int. Cl.
    *H04L 12/24*        (2006.01)
    *H04L 12/715*       (2013.01)
    (Continued)

(52) U.S. Cl.
    CPC .......... *H04L 41/12* (2013.01); *H04L 41/0213* (2013.01); *H04L 45/64* (2013.01); *H04L 45/02* (2013.01); *H04L 69/324* (2013.01)

(58) Field of Classification Search
    CPC ......... H04L 41/12; H04L 45/42; H04L 45/02; H04L 45/38; H04L 41/0213; H04L 45/00;
    (Continued)

(56) References Cited

U.S. PATENT DOCUMENTS 9,917,766 B2 *   3/2018   Devarajan ............. H04L 12/462
2015/0098339 A1  4/2015   Jocha
                         (Continued)

FOREIGN PATENT DOCUMENTS

CN      103765823 A     4/2014
CN      104579968 A     4/2015
                (Continued)

OTHER PUBLICATIONS

XP032804729.Vijaya Durga Chemalamarri et al. SYMPHONY—A Controller Architecture for Hybrid Software Defined Networks, Fourth European Workshop on Software Defined Networks. 2015 IEEE. pp. 55-60.

*Primary Examiner* — Jae Y Lee
*Assistant Examiner* — Aixa A Guadalupe Cruz
(74) *Attorney, Agent, or Firm* — Womble Bond Dickinson (US) LLP

(57) ABSTRACT

Embodiments of this application disclose a topology determining method used by an OFC to determine a complete topology structure of a hybrid SDN-IP network. The method includes: receiving, by an OFC, a first message forwarded by a first OFS; determining information about a link from the first TS to the first OFS based on the first message; sending a second message to the first OFS, and instructing the first OFS to forward the second message on the first port; sending a third message to the first OFS; receiving a first response message, where the first response message carries the MIB information of the first TS; and obtaining the information about the link from the first OFS to the first TS and information about a link from a second TS to the first TS based on the MIB information of the first TS.

17 Claims, 9 Drawing Sheets

(51) Int. Cl.
*H04L 12/751* (2013.01)
*H04L 29/08* (2006.01)

(58) Field of Classification Search
CPC ....... H04L 45/745; H04L 47/10; H04L 45/52; H04L 45/08; H04L 45/74
See application file for complete search history.

(56) References Cited

U.S. PATENT DOCUMENTS

| | | |
|---|---|---|
| 2016/0080254 A1 | 3/2016 | Zhou et al. |
| 2016/0241459 A1 | 8/2016 | Zheng et al. |
| 2016/0301607 A1 | 10/2016 | Man et al. |

FOREIGN PATENT DOCUMENTS

| | | |
|---|---|---|
| CN | 104734988 A | 6/2015 |
| WO | 2017142516 A1 | 8/2017 |

* cited by examiner

TOPOLOGY DETERMINING METHOD, MESSAGE RESPONSE METHOD, CONTROLLER, AND SWITCH

CROSS-REFERENCE TO RELATED APPLICATIONS

This application is a continuation of International Application No. PCT/CN2017/077120, filed on Mar. 17, 2017, which claims priority to Chinese Patent Application No. 201610503105.8, filed on Jun. 30, 2016, the disclosures of which are incorporated herein by reference in their entireties.

TECHNICAL FIELD

This application relates to the communications field, and in particular, to a topology determining method, a message response method, a controller, and a switch.

BACKGROUND

A software-defined network (SDN) is a new network. In OpenFlow, a core technology of the SDN, a control plane and a data plane of a network device are separated, implementing flexible network traffic control. As a result, a network becomes more intelligent as a channel.

At a current stage, a traditional Internet Protocol (IP) network is in gradual transition to an SDN network. In the transition process, there may be both a traditional switch and an OpenFlow switch (OFS) in a network of an operator, and a hybrid SDN-IP network in which the traditional switch coexists with the OFS is formed. For ease of description, the traditional switch is collectively referred to as TS herein below. In this application, a TS is a device that has a forwarding function and that runs the IP protocol. In actual application, the TS may be a switch that performs layer 2 or layer 3 forwarding, or a router that performs layer 3 forwarding.

In addition to the OFS and the TS, the hybrid SDN-IP network further includes an OpenFlow controller (OFC) configured to control and manage the OFS in the network. While an existing TS design is not changed, the OFS may discover, by using the Link Layer Discovery Protocol (LLDP), the TS connected to the OFS, and report the TS to the OFC, so that the OFC learns of a link from the TS to the OFS. However, the OFC cannot learn of a link from the OFS to the TS, and cannot learn of a link between TSs, either. In other words, in the prior art, the OFC cannot learn of a complete topology structure of the hybrid SDN-IP network, and an optimal path cannot be determined during end-to-end routing, resulting in relatively low forwarding performance of the hybrid SDN-IP network.

SUMMARY

This application provides a topology determining method, used by an OFC to obtain a topology structure of a hybrid SDN-IP network.

A first aspect of this application provides a topology determining method, including: receiving, by an OFC from a first OFS, a first message from a first TS, where a first port of the first OFS is connected to a second port of the first TS, and the first message includes identification information of the first TS and information about the second port; obtaining, by the OFC, information about a link from the first TS to the first OFS based on the first message; sending, by the OFC, a second message to the first OFS, where the second message includes a first instruction, and the first instruction is used to instruct the first OFS to forward the second message on the first port, so that the first TS can receive the second message on the second port, to obtain information about a link from the first OFS to the first TS; sending, by the OFC, a third message to the first OFS, where the third message is used to request management information base (MIB) information of the first TS, the third message carries a second instruction, and the second instruction is used to instruct the first OFS to forward the third message on the first port, so that the third message is received by the first TS; receiving, by the OFC from the first OFS, a response message, sent by the first TS, of the third message, where the response message of the third message carries the MIB information of the first TS; and obtaining, by the OFC, the information about the link from the first OFS to the first TS and information about a link from a second TS to the first TS based on the MIB information of the first TS, where the second TS is connected to the first TS. In this application, the OFC in a hybrid SDN-IP network requests MIB information of a TS from the TS, and obtains, from the MIB information of the TS, information about a link from an OFS to the TS and information about a link between TSs. In this way, the OFC can determine a complete topology structure of the hybrid SDN-IP network, and an optimal routing path can be determined in a subsequent routing calculation process, thereby improving forwarding performance of the hybrid SDN-IP network.

In one embodiment, the MIB information of the first TS includes identification information of the second TS. After obtaining the MIB information of the first TS, the OFC may further send a fourth message to the first OFS based on the identification information of the second TS, where the fourth message is used to request MIB information of the second TS. The fourth message carries a third instruction used to instruct the first OFS to forward the fourth message on the first port, so that the third message can be received by the first TS. The fourth message further includes a source routing domain field, where the source routing domain field includes the identification information of the second TS, and is used to instruct the first TS to forward the fourth message to the second TS. The OFC receives a response message of the fourth message, where the response message of the fourth message is sent by the second TS, and is forwarded sequentially by the first TS and the first OFS to the OFC. The response message of the fourth message carries the MIB information of the second TS. The OFC obtains, through calculation, information about a link from a third TS to the second TS based on the MIB information of the second TS, where the third TS is connected to the second TS.

In one embodiment, the OFC includes an IP MIB and an OpenFlow MIB. The OFC saves the MIB information of the first TS and the MIB information of the second TS in the IP MIB, and saves, in the OpenFlow MIB, the information about the link from the first TS to the first OFS.

In one embodiment, the third message includes a Simple Network Management Protocol (SNMP) request (or get-request) message, and the first SNMP get-request message is used to request the MIB information of the first TS. The response message of the third message includes a first SNMP response (or get-response) message, and the first SNMP get-response message is used to carry the MIB information of the first TS. The fourth message includes a second SNMP get-request message, and the second SNMP get-request message is used to request the MIB information of the second TS. The response message of the fourth message includes a second SNMP get-response message, and the second SNMP get-response message is used to carry the MIB information of the second TS.

In one embodiment, the third message may be in a form of a packet out message, and in addition to the first SNMP get-request message encapsulated in the third message, the third message includes an ofp_action_type field. Content filling the ofp_action_type field in the third message is used to indicate that an SNMP get-request message is encapsulated in the third message. Correspondingly, the response message of the third message may be in a form of a packet in message, and in addition to the first SNMP get-response message encapsulated in the response message, the response message of the third message includes a reason field. The reason field in the packet in message is used to indicate a reporting reason of the packet in message, and content filling the reason field in the response message of the third message is used to indicate that the response message of the third message carries MIB information of a TS, and specifically carries the MIB information of the first TS.

In one embodiment, the fourth message may be in a form of a packet out message, and in addition to the second SNMP get-request message encapsulated in the fourth message, the fourth message includes an ofp_action_type field, and content filling the ofp_action_type field in the fourth message is used to indicate that an SNMP get-request message is encapsulated in the fourth message. Correspondingly, the response message of the fourth message may be in a form of a packet in message, and in addition to the second SNMP get-response message encapsulated in the response message, the response message of the fourth message includes a reason field. The reason field in the response message of the fourth message is used to indicate that the response message of the fourth message carries MIB information of a TS, and specifically carries the MIB information of the second TS.

In one embodiment, a first LLDP packet is encapsulated in the first message, and the first LLDP packet carries the identification information of the first TS and the information about the second port.

A second aspect of this application provides a message response method, applicable to a first TS in a hybrid SDN-IP network, including: receiving, by the first TS, a third message on a second port, where the third message is sent by an OFC, and is used by the OFC to request MIB information of the first TS; and sending, by the first TS, a response message of the third message on the second port, where the response message of the third message carries the MIB information of the first TS. In this way, the first TS can feed back the MIB information of the first TS to the OFC, so that the OFC can complete a topology structure of the hybrid SDN-IP network.

In one embodiment, the second port of the first TS is connected to a first port of a first OFS. The third message is sent by the OFC to the first OFS, and the OFC instructs the first OFS to forward the third message on the first port, so that the third message is received by the first TS.

In one embodiment, the second port of the first TS is connected to another TS other than the first TS in the hybrid SDN-IP network, for example, is connected to a target TS. The third message is forwarded by the OFC to the target TS, and the OFC instructs the target TS to forward the third message to the first TS.

In one embodiment, the first TS may further receive a fourth message on the second port, where the fourth message is used to request MIB information of a second TS, the fourth message includes a source routing domain field, the source routing domain field includes identification information of the second TS, and the second TS is connected to the first TS. The first TS forwards the fourth message to the second TS in a source routing manner according to an instruction of the source routing domain field. The first TS is further configured to: receive a response message, returned by the second TS, of the fourth message, and send the response message of the fourth message on the second port, so that the response message of the fourth message can be sent to the OFC according to a link reverse to that of the fourth message. The response message of the fourth message carries the MIB information of the second TS.

In one embodiment, the third message includes a first SNMP get-request message, and the first SNMP get-request message is used to request the MIB information of the first TS. The response message of the third message includes a first SNMP get-response message, and the first SNMP get-response message is used to carry the MIB information of the first TS. The fourth message includes a second SNMP get-request message, and the second SNMP get-request message is used to request the MIB information of the second TS. The response message of the fourth message includes a second SNMP get-response message, and the second SNMP get-response message is used to carry the MIB information of the second TS.

A third aspect of the present disclosure provides an OFC, applicable to a hybrid SDN-IP network, including: a message receiving module, configured to receive a first message forwarded by a first OpenFlow switch OFS, where a first port of the first OFS is connected to a second port of a first TS, the first message is sent by the first TS to the first OFS, and then is forwarded by the first OFS to the OFC, and the first message includes identification information of the first TS and information about the second port; a message processing module, configured to determine information about a link from the first TS to the first OFS based on the first message; and a message sending module, configured to send a second message to the first OFS, where the second message includes a first instruction, and the first instruction is used to instruct the first OFS to forward the second message on the first port, so that the first TS obtains information about a link from the first OFS to the first TS. The message sending module is further configured to send a third message to the first OFS, where the third message is used to request MIB information of the first TS, the third message carries a second instruction, and the second instruction is used to instruct the first OFS to forward the third message on the first port. The message receiving module is further configured to receive a response message, forwarded by the first OFS, of the third message, where the response message of the third message is sent by the first TS, and the response message of the third message carries the MIB information of the first TS. The message processing module is further configured to obtain the information about the link from the first OFS to the first TS and information about a link from a second TS to the first TS based on the MIB information of the first TS. The OFC requests MIB information of a TS from the TS, obtains, from the MIB information of the TS, information about a link from an OFS to the TS and information about a link between TSs, and can determine a complete topology structure of the hybrid SDN-IP network. An optimal routing path can be determined in a subsequent routing calculation process, and forwarding performance of the hybrid SDN-IP network is improved.

In one embodiment, the MIB information of the first TS includes identification information of the second TS. The message sending module is further configured to send a fourth message to the first OFS, where the fourth message is used to request MIB information of the second TS, the fourth message carries a third instruction used to instruct the first OFS to forward the fourth message on the first port, the fourth message further includes a source routing domain field, and the source routing domain field includes the identification information of the second TS, and is used to instruct the first TS to forward the fourth message to the second TS. The message receiving module is further configured to receive a response message, forwarded by the first OFS, of the fourth message, where the response message of the fourth message is sent by the second TS, and the response message of the fourth message carries the MIB information of the second TS. The message processing module is further configured to obtain information about a link from a third TS to the second TS based on the MIB information of the second TS, where the third TS is connected to the second TS.

In one embodiment, the OFC includes an IP MIB and an OpenFlow MIB, and the message processing module is further configured to: save the MIB information of the first TS and the MIB information of the second TS in the IP MIB of the OFC, and save, in the OpenFlow MIB, the information about the link from the first TS to the first OFS.

In one embodiment, the third message includes a first SNMP get-request message, and the first SNMP get-request message is used to request the management information base MIB information of the first TS. The response message of the third message includes a first SNMP get-response message, and the first SNMP get-response message is used to carry the MIB information of the first TS. The fourth message includes a second SNMP get-request message, and the second SNMP get-request message is used to request the MIB information of the second TS. The response message of the fourth message includes a second SNMP get-response message, and the second SNMP get-response message is used to carry the MIB information of the second TS.

In one embodiment, the response message of the third message is a packet in message in which the first SNMP get-response message is encapsulated, the response message of the third message further includes a reason field, and the reason field in the response message of the third message is used to indicate that the response message of the third message carries the MIB information of the first TS. The response message of the fourth message is a packet in message in which the second SNMP get-response message is encapsulated, the response message of the fourth message further includes a reason field, and the reason field in the response message of the fourth message is used to indicate that the response message of the fourth message carries the MIB information of the second TS.

In one embodiment, a first LLDP packet is encapsulated in the first message, and the first LLDP packet carries the identification information of the first TS and the information about the second port.

A fourth aspect of this application provides a TS, serving as a first TS in a hybrid SDN-IP network. The TS includes: a message receiving module, configured to receive a third message on a second port of the first TS, where the third message is used by an OFC to request MIB information of the first TS; and a message sending module, configured to send a response message of the third message on the second port, where the response message of the third message carries the MIB information of the first TS. The first TS provided in this application can feed back the MIB information of the first TS to the OFC, so that the OFC can complete a topology structure of the hybrid SDN-IP network.

In one embodiment, the second port of the first TS is connected to a first port of a first OFS, and the OFC instructs the first OFS to forward the third message on the first port.

In one embodiment, the second port of the first TS is connected to a target TS other than the first TS in the hybrid SDN-IP network, and the OFC instructs the target TS to forward the third message to the first TS.

In one embodiment, the message receiving module is further configured to receive a fourth message on the second port, where the fourth message is used to request MIB information of a second TS, the fourth message includes a source routing domain field, the source routing domain field includes identification information of the second TS, and the second TS is connected to the first TS. The message sending module is further configured to forward the fourth message to the second TS according to an instruction of the source routing domain field. The message receiving module is further configured to receive a response message, returned by the second TS, of the fourth message, where the response message of the fourth message carries the MIB information of the second TS. The message sending module is further configured to send the response message of the fourth message on the second port.

In one embodiment, the third message includes a first SNMP get-request message, and the first SNMP get-request message is used to request the MIB information of the first TS. The response message of the third message includes a first SNMP get-response message, and the first SNMP get-response message is used to carry the MIB information of the first TS. The fourth message includes a second SNMP get-request message, and the second SNMP get-request message is used to request the MIB information of the second TS. The response message of the fourth message includes a second SNMP get-response message, and the second SNMP get-response message is used to carry the MIB information of the second TS.

A fifth aspect of this application provides an OFC, including a processor, a memory, a communications interface, and a bus. The processor invokes a program stored in the memory, to perform the method provided in the first aspect of this application.

A sixth aspect of this application provides a TS, including a processor, a memory, a communications interface, and a bus. The processor invokes a program stored in the memory, to perform the method provided in the second aspect of this application.

BRIEF DESCRIPTION OF DRAWINGS

FIG. 3 (*b*) is a structural diagram of a TS according to one embodiment;

FIG. 4 (*b*) is a schematic diagram of a format of an SNMP message;

FIG. 5 (*b*) is a schematic diagram of a principle of discovering a link from a first TS to a first OFS according to one embodiment;

FIG. 5 (c) is a schematic diagram of a principle of discovering a link from a first OFS to a first TS according to one embodiment;

FIG. 5 (d) is a schematic diagram of a principle of obtaining MIB information of a first TS by an OFC according to one embodiment;

FIG. 5 (e) is a schematic diagram of a principle of obtaining MIB information of a second TS by an OFC according to one embodiment;

DESCRIPTION OF EMBODIMENTS

This application provides a topology determining method, used by an OFC to determine a complete topology of a hybrid SDN-IP network. This application further provides a related OFC and TS, and descriptions are separately provided in the following.

Figure 1:
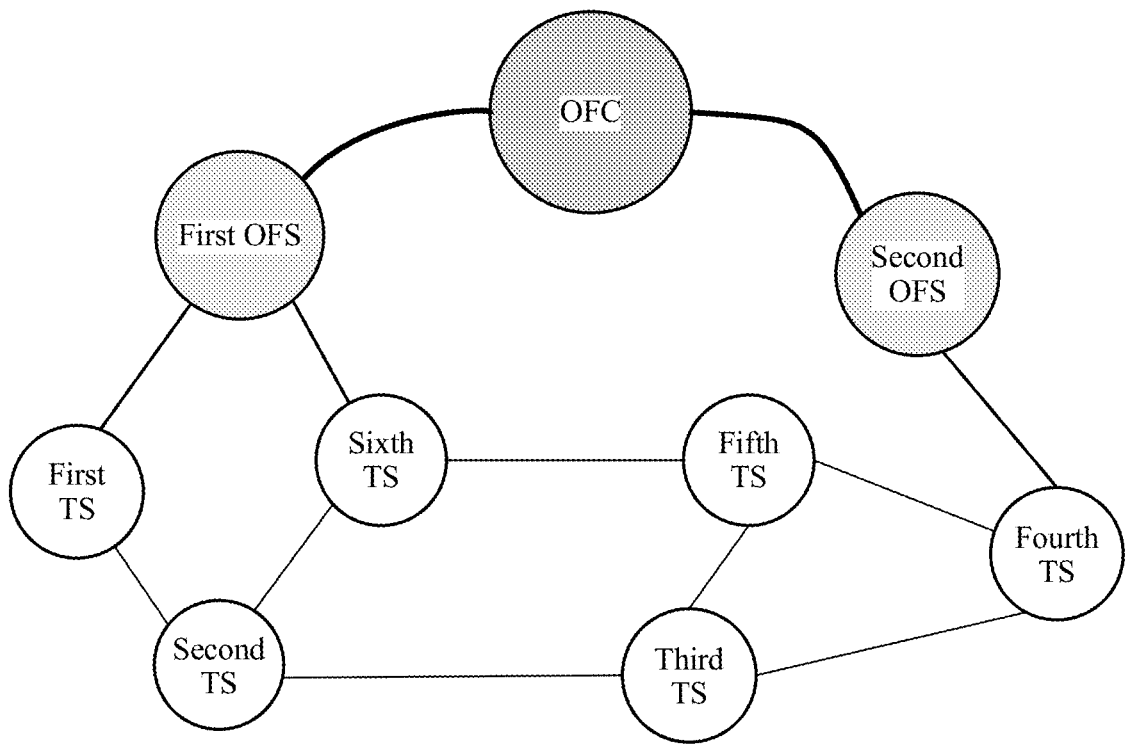
FIG. 1 is a schematic diagram of an architecture of a hybrid SDN-IP network.

A hybrid SDN-IP network is used in transition from a traditional IP network to a new SDN network. FIG. 1 is a schematic diagram of an architecture of a hybrid SDN-IP network. The hybrid SDN-IP network includes an OFC and one or more OFSs. It can be seen from FIG. 1 that, in addition to the OFSs and the OFC used to manage the OFSs, the hybrid SDN-IP network may include TSs connected to the OFSs. The OFC is not directly connected to the TSs, and therefore the OFC does not directly control and manage the TSs.

LLDP is a standard link layer discovery manner. In this manner, information about a local end device such as a main capability, a management address, a device identifier, and an interface identifier may be organized into different type-length-values (TLV), is encapsulated in a Link Layer Discovery Protocol data unit (LLDPDU), and is released, in an LLDP packet form, to a neighbor directly connected to the local end device. After receiving the information, the neighbor saves the information in an MIB information form, so that a system can query and determine a link communication status.

An MIB is one piece of content of a Transmission Control Protocol/Internet Protocol (TCP/IP) standard framework. The MIB defines a data element that needs to be stored in a managed device, an operation allowed to be performed on each data element, and meaning of the operation. In other words, a data variable such as control and status information of a managed device that can be accessed by a management system is stored in the MIB. In this application, information such as a connection relationship between devices in the hybrid SDN-IP network is stored in an MIB of each network device.

Figure 2:
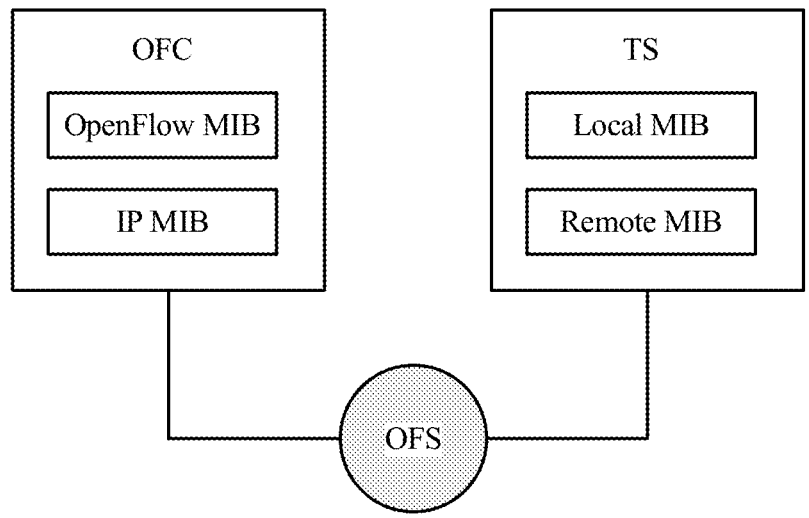
FIG. 2 is a schematic diagram of another architecture of a hybrid SDN-IP network.

FIG. 2 is a schematic diagram of another architecture of a hybrid SDN-IP network. An MIB of a TS includes at least an LLDP local system MIB (also referred to as local MIB) and an LLDP remote system MIB (also referred to as remote MIB). The local MIB is used to store information about a local device of the TS, including information about the local device such as a device identifier (ID), an interface ID, a system name, a system description, an interface description, a device capability, and a network management address. The remote MIB is used to store information about a neighboring device, including information about the neighboring device such as a device ID, an interface ID, a system name, a system description, an interface description, a device capability, and a network management address.

Still as shown in FIG. 2, because the hybrid SDN-IP network includes both an OFS using the OpenFlow protocol and a TS using the TCP/IP protocol, an MIB of an OFC in this application includes at least an OpenFlow MIB and an IP MIB. The OpenFlow MIB is mainly used to store device information of the OFS, information about a link between OFSs, and information about a link from the TS to the OFS, and the IP MIB is mainly used to store MIB information of the TS that is requested from the TS.

In one embodiment, the hybrid SDN-IP network may perform unified management on the OFC and the TS by using a network management system. For example, a network management server (NMS) may be deployed on the OFC to manage the OpenFlow MIB and the IP MIB on the OFC, for example, parse a received message, save, in the OpenFlow MIB or the IP MIB, required content in the message, and calculate a network topology based on information stored in the OpenFlow MIB and the IP MIB. Correspondingly, a network management agent (NMA) may be deployed on the TS to manage local MIB information and remote MIB information on the TS.

Figure 3:
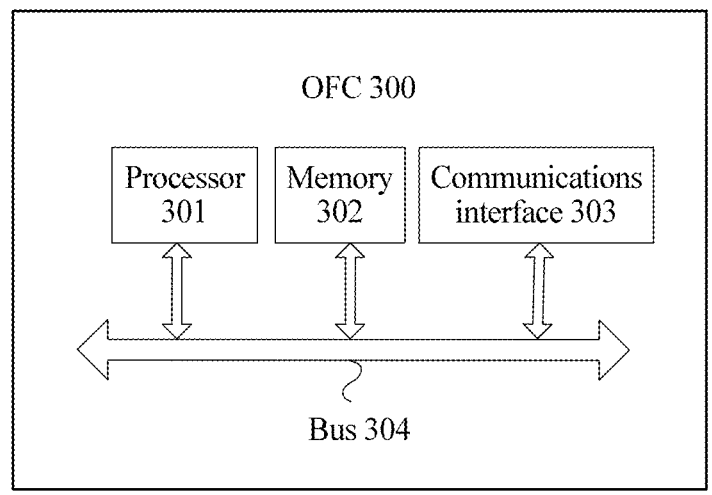
FIG. 3 (*a*) is a structural diagram of an OFC according to one embodiment.
Figure 3:
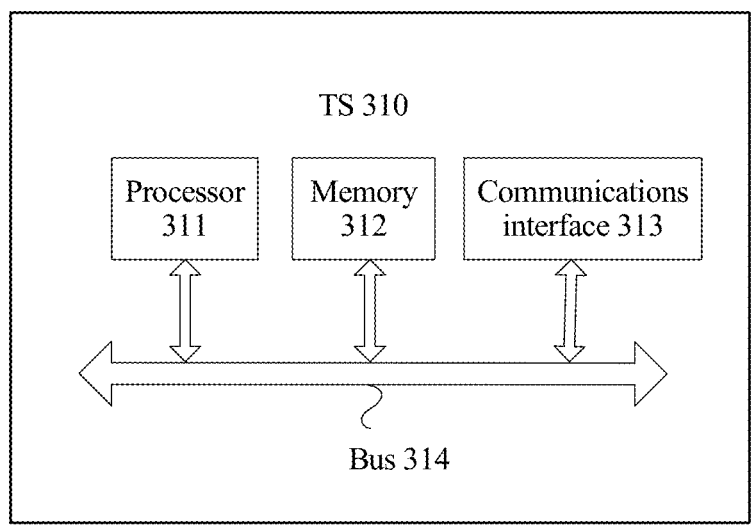

The OFC shown in FIG. 1 and FIG. 2 may be implemented by an OFC 300 shown in FIG. 3 (a), and the OFC 300 mainly includes a processor 301, a memory 302, a communications interface 303, and a bus 304. The processor 301, the memory 302, and the communications interface 303 may implement mutual communication connection by using the bus 304 or may implement communication by other means such as wireless transmission.

The memory 302 may be a volatile storage medium (or volatile memory) such as a random-access memory (RAM), or may be a non-volatile storage medium. When the technical solutions provided in this application are implemented by using software, program code used to implement the method provided in this application may be stored in the memory 302, and may be executed by the processor 301.

The processor 301 may be any one or a combination of the following hardware units with a processing function: a central processing unit (CPU), a graphics processing unit (GPU), digital signal processing (DSP), an application-specific integrated circuit (ASIC), a field programmable gate array (FPGA), a hardware chip, and the like. The processor 301 is mainly configured to: control the communications interface 303 to receive a first message forwarded by a first OFS, where a first port of the first OFS is connected to a second port of a first traditional switch TS, the first message is sent by the first TS to the first OFS, and the first message includes identification information of the first TS and information about the second port; determine information about a link from the first TS to the first OFS based on the first message; send a second message to the first OFS, where the second message includes a first instruction, and the first instruction is used to instruct the first OFS to forward the second message on the first port, so that the first TS obtains information about a link from the first OFS to the first TS; send a third message to the first OFS, where the third message is used to request management information base MIB information of the first TS, the third message carries a second instruction, and the second instruction is used to instruct the first OFS to forward the third message on the first port; receive a response message, forwarded by the first OFS, of the third message, where the response message of the third message is sent by the first TS, and the response message of the third message carries the MIB information of the first TS; and obtain the information about the link from the first OFS to the first TS and information about a link from a second TS to the first TS based on the MIB information of the first TS.

In one embodiment, the MIB information of the first TS includes identification information of the second TS. The processor 301 is further configured to: send a fourth message to the first OFS, where the fourth message is used to request MIB information of the second TS, the fourth message carries a third instruction used to instruct the first OFS to forward the fourth message on the first port, the fourth message further includes a source routing domain field, and the source routing domain field includes the identification information of the second TS, and is used to instruct the first TS to forward the fourth message to the second TS; receive a response message, forwarded by the first OFS, of the fourth message, where the response message of the fourth message is sent by the second TS, and the response message of the fourth message carries the MIB information of the second TS; and obtain information about a link from a third TS to the second TS based on the MIB information of the second TS, where the third TS is connected to the second TS.

In one embodiment, the memory 302 includes an IP MIB and an OpenFlow MIB, and the processor 301 is further configured to: save the MIB information of the first TS and the MIB information of the second TS in the IP MIB of the OFC, and save, in the OpenFlow MIB, the information about the link from the first TS to the first OFS.

The TS shown in FIG. 1 and FIG. 2 may be implemented by a TS 310 shown in FIG. 3 (b), and the TS 310 mainly includes a processor 311, a memory 312, a communications interface 313, and a bus 314. The processor 311, the memory 312, and the communications interface 313 may implement mutual communication connection by using the bus 314 or may implement communication by other means such as wireless transmission.

The memory 312 may be a volatile storage medium such as a RAM, or may be a non-volatile storage medium. Local MIB information and remote MIB information of the TS are stored in the memory 312. When the technical solutions provided in this application are implemented by using software, program code used to implement the method provided in this application may be stored in the memory 302, and may be executed by the processor 311.

The processor 311 may be any one or a combination of the following hardware units with a processing function: a CPU, a GPU, a DSP, an ASIC, an FPGA, a hardware chip, and the like. The processor 311 is mainly configured to: control the communications interface 313 to receive a third message, and generate a response message of the third message for sending on the communications interface 313. The third message is used by an OFC to request MIB information of a first TS, and the response message of the third message carries the MIB information of the first TS.

In one embodiment, the processor 311 is further configured to: control the communications interface 313 to receive a fourth message, where the fourth message includes a source routing domain field, the source routing domain field includes identification information of a second TS, and the second TS is connected to the first TS; forward the fourth message to the second TS according to an instruction of the source routing domain field by using the communications interface 313; control the communications interface 313 to receive a response message, returned by the second TS, of the fourth message, where the response message of the fourth message carries MIB information of the second TS; and send the response message of the fourth message on a second port by using the communications port 313.

The following gradually describes, with reference to the hybrid SDN-IP network architecture shown in FIG. 1 by using an example of determining a topology relationship among the OFC, the first OFS, the first TS, and the second TS, a basic principle of a topology determining method proposed in this application.

(I) Mutual Discovery Between the First TS and the Second TS

Figure 5:
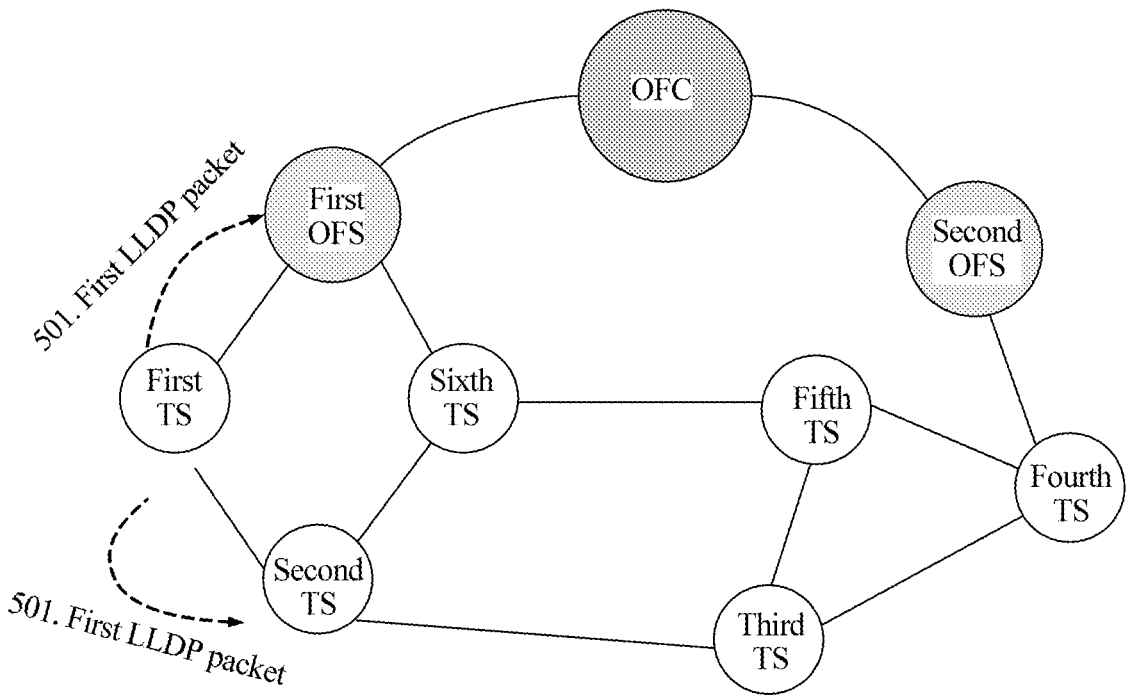
FIG. 5 (*a*) is a schematic diagram of a principle of discovering links between a first TS and a second TS according to one embodiment.
Figure 5:
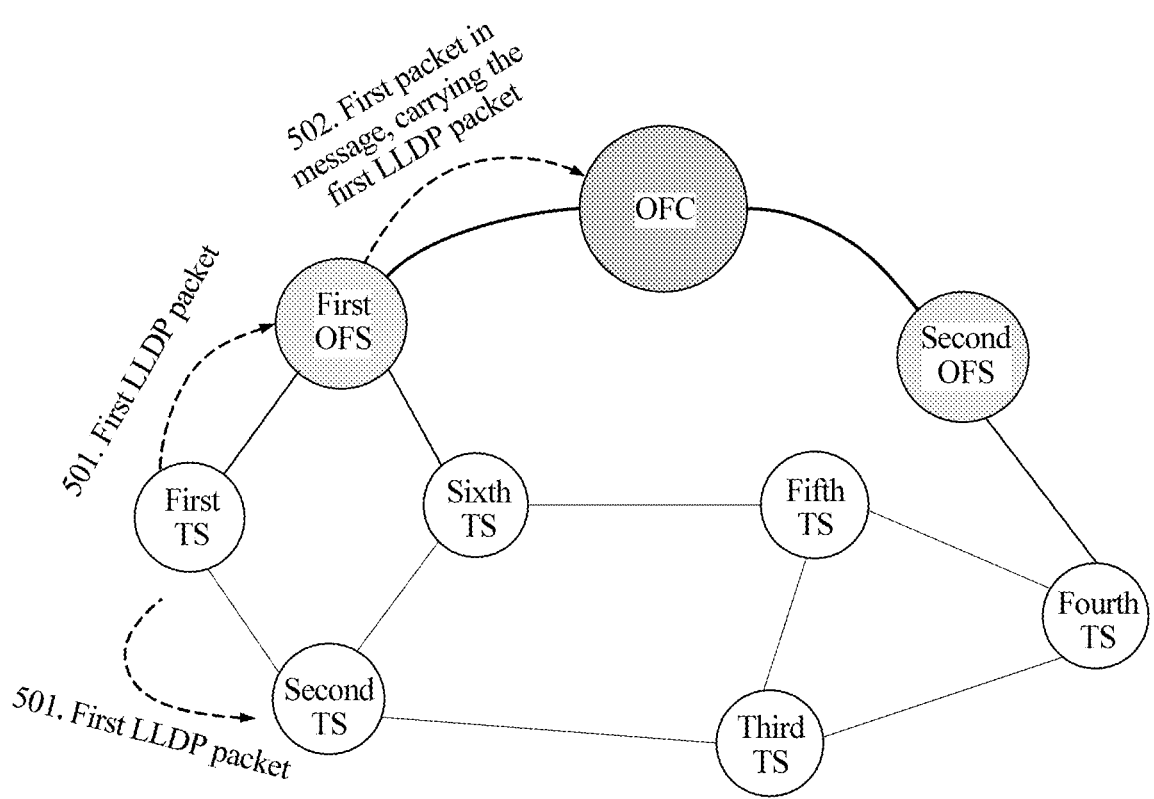
Figure 5:
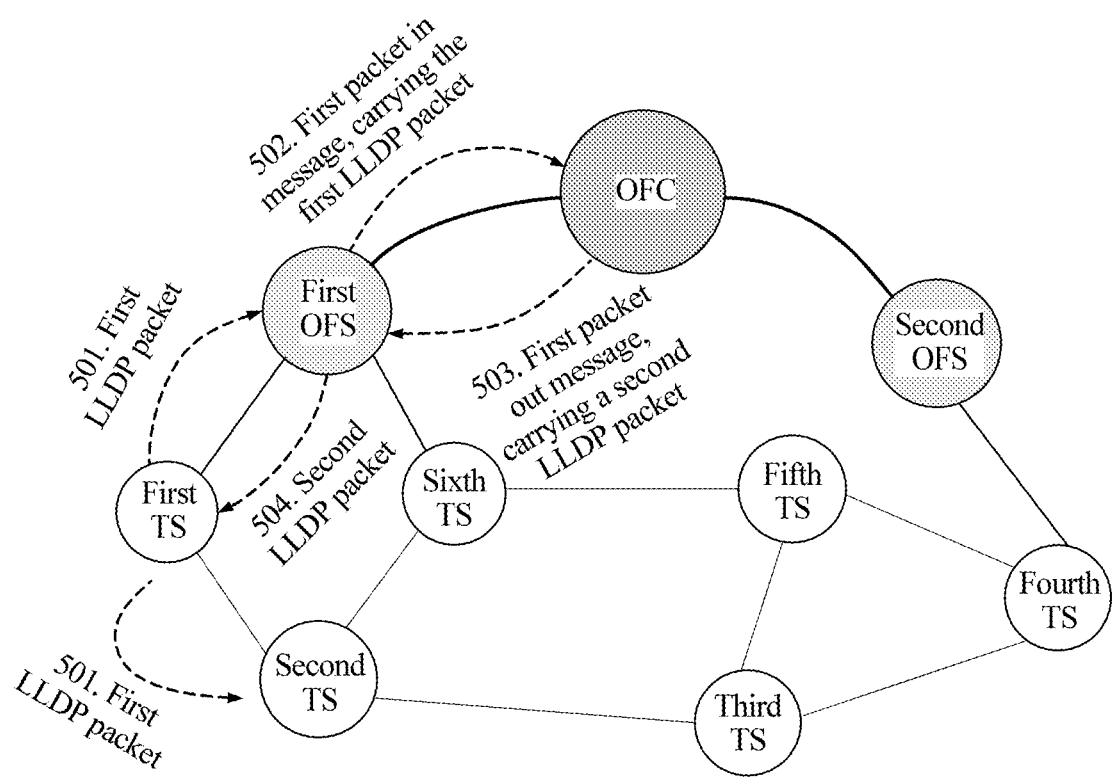
Figure 5:
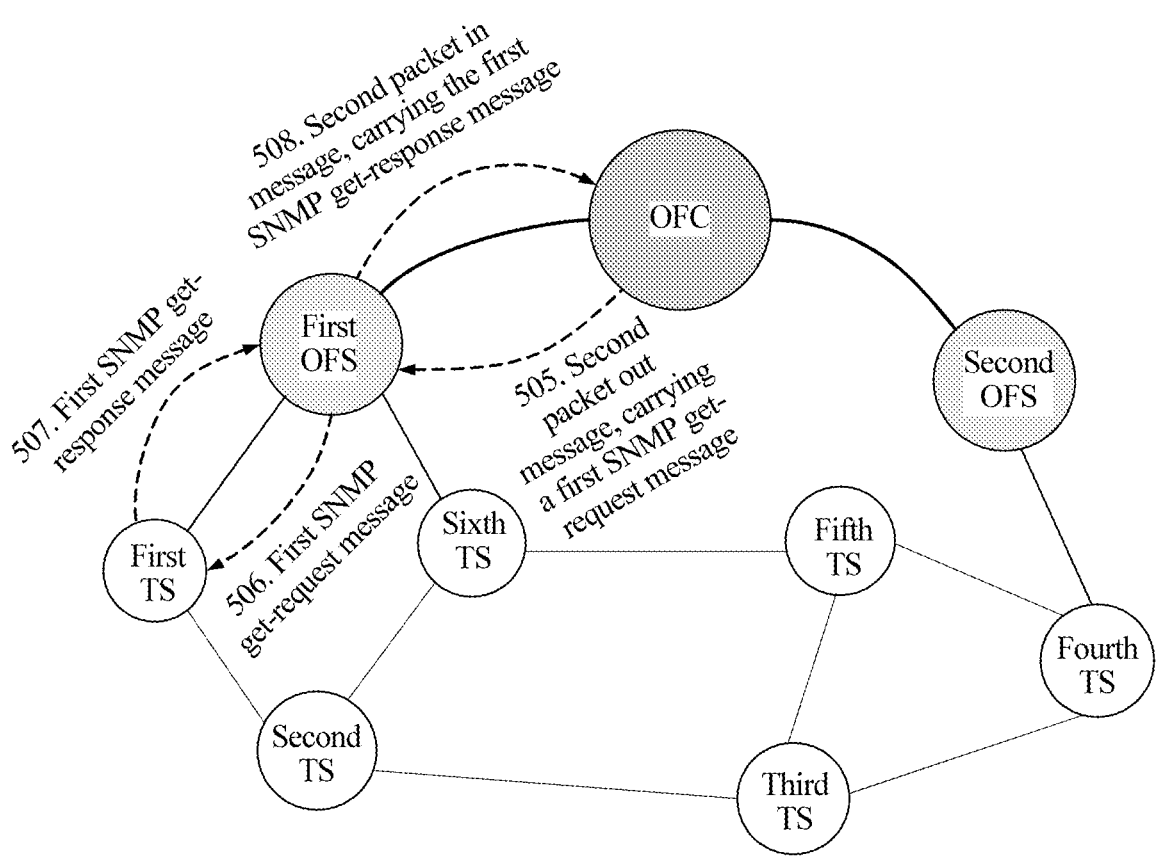
Figure 5:
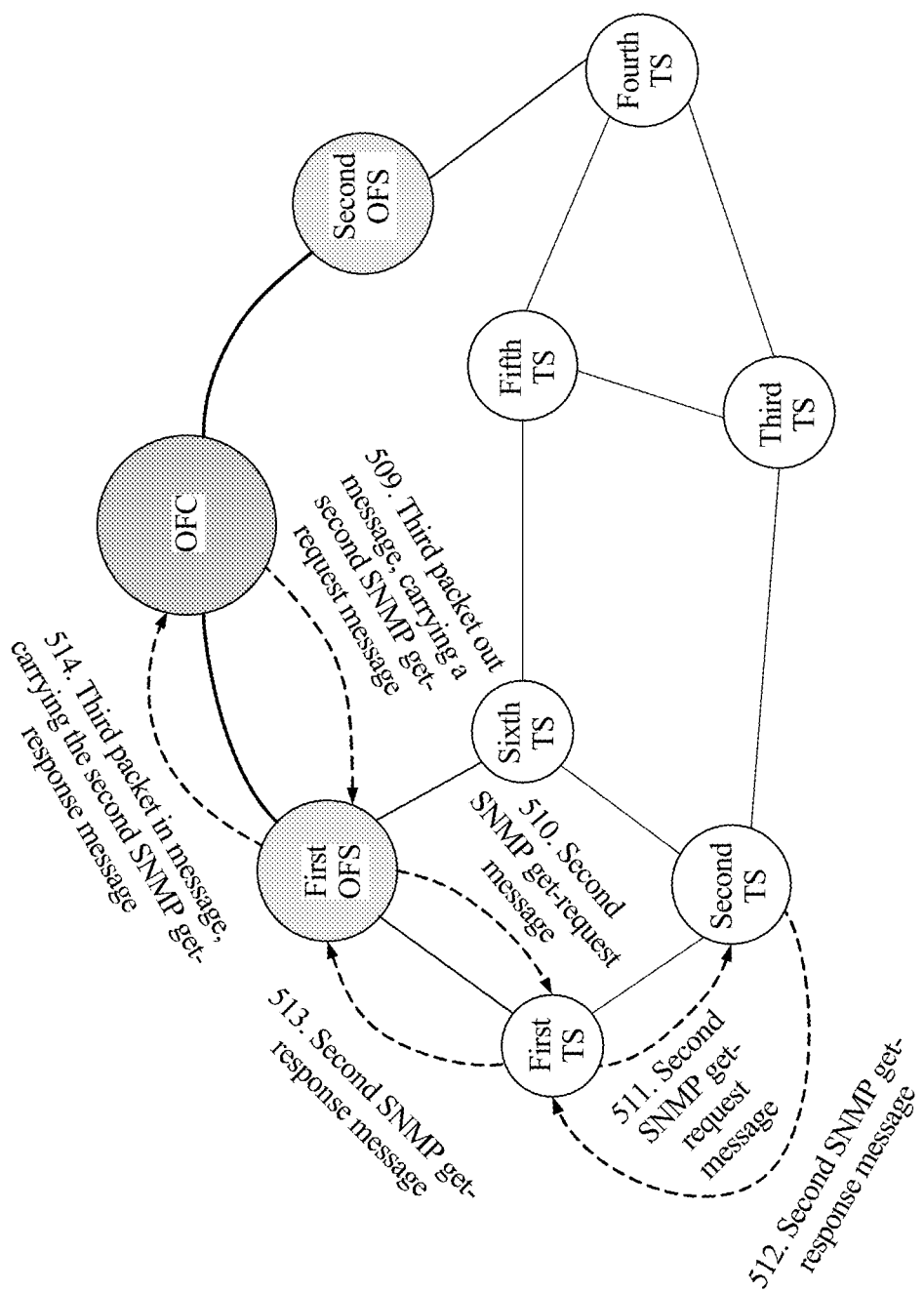

Refer to FIG. 5 (a). A switch periodically sends an LLDP packet to a neighboring device in a normal working mode, to notify the neighboring device of local device information. When a local configuration changes, the switch immediately sends an LLDP packet to the neighboring device, to notify the neighboring device of a change of the local device information. Link discovery between TSs in this application uses this traditional discovery manner.

In an example of the first TS, the first TS constructs a first LLDP packet, and periodically sends the constructed first LLDP packet from local active ports through multicast, as shown in step 501. The first LLDP packet carries device information of the first TS. After receiving the first LLDP packet, the second TS can obtain the device information of the first TS by parsing an LLDPDU in the first LLDP packet. The second TS updates the obtained device information of the first TS to a remote MIB of the second TS. In this way, the second TS discovers the first TS.

Figure 4:
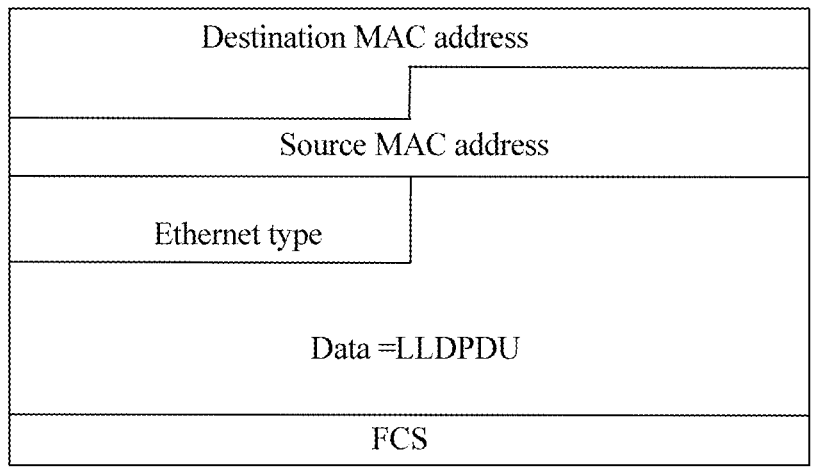
FIG. 4 (*a*) is a schematic diagram of a format of an LLDP packet.
Figure 4:
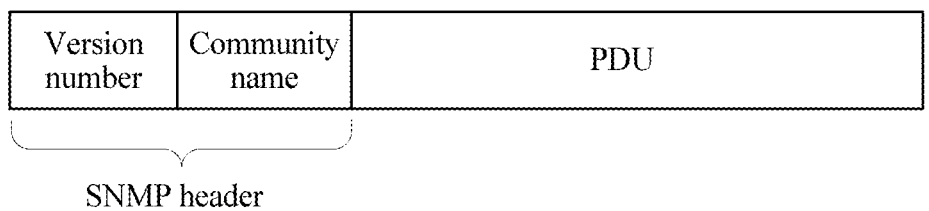

An LLDP packet is usually encapsulated in an Ethernet II manner and a Subnetwork Access Protocol (SNAP) manner. An encapsulated LLDP packet mainly includes the following parts: (1) a destination MAC address (Dst_MAC), (2) a source MAC address (Src_MAC), (3) an Ethernet type (Eth_Type), (4) data that is an LLDPDU, and (5) a frame check sequence (FCS). FIG. 4 (a) is a schematic diagram of a format of the LLDP packet encapsulated in the Ethernet II manner.

Data in the LLDPDU is organized in a TLV form, and includes at least: (1) a chassis ID used to send a bridge MAC address of a device, (2) a port number (also referred to as Port ID) of an LLDPDU sending port, (3) a time to live of information about this device on a neighboring device, and (4) an end identifier of the LLDPDU (also referred to as End of LLDPDU).

Based on the description of the LLDP packet format, this application provides a specific instance of the first LLDP packet. Instances provided in this application provide only an example of a value of each field in a packet or a message, and each field in the packet or message may also be another value in actual application:

Dst_MAC: 01-80-C2-00-00-0E
Src_MAC: MAC address of the first TS
Eth_Type: 0x88CC
LLDPDU:
Chassis ID: subtype=5, and carrying an IP address of the first TS
Port ID: subtype=2, port information (or Port Component)
Time to Live: 3
End of LLDPDU The first TS may also discover the second TS based on a same method, and details are not described herein again.

(II) Discovery of a Link from the First TS to the First OFS

Refer to FIG. 5 (b). In (I), the first TS sends the first LLDP packet through multicast, and the first LLDP packet may also be received by the neighboring first OFS. After receiving the first LLDP packet, the first OFS encapsulates the first LLDP packet in its entirety in a first packet in message and reports the first packet in message to the OFC, as shown in step 502.

After receiving the first packet in message sent by the first OFS, the OFC parses the first LLDP packet in the first packet in message, to obtain information about the link from the first TS to the first OFS.

A packet in message includes a "reason" field used to indicate a reporting reason of the packet in message. In this application, a "reason" field in the first packet in message is used to indicate that the first packet in message is used to report the information about the link from the first TS to the first OFS.

Complete link information includes identification information of a source end device, port information of the source end device, identification information of a destination end device, and port information of the destination end device. Identification information of a device may be an IP address, a MAC address, or a device ID of the device, or may be other information that can uniquely identify the device. Port information of a device may be a port number of a port through which the device accesses a link. For example, the information about the link from the first TS to the first OFS may include the IP address of the first TS, information about a second port, connected to the first OFS, of the first TS, an IP address of the first OFS, and port information of a first port, connected to the first TS, of the first OFS.

After obtaining the information about the link from the first TS to the first OFS, the OFC saves the information about the link from the first TS to the first OFS in a local OpenFlow MIB of the OFC.

(III) Discovery of a Link from the First OFS to the First TS

Refer to FIG. 5 (*c*). In (II), the OFC learns of the port information of the first port, connected to the first TS, of the first OFS. Therefore, the OFC constructs a first packet out message and sends the first packet out message to the first OFS, as shown in step 503. A first instruction is encapsulated in the first packet out message, and the first instruction is used to instruct the first OFS to forward the first packet out message on the first port. A second LLDP packet is also encapsulated in the first packet out message. A specific instance of the second LLDP packet is as follows:
  Dst_MAC: 01-80-C2-00-00-0E
  Src_MAC: MAC address of the first port of the first OFS
  Eth_Type: 0x88CC
  LLDPDU:
  Chassis ID: subtype=5, and carrying the IP address of the first OFS
  Port ID: subtype=2, Port Component
  Time to Live: 3
  End of LLDPDU After receiving the first packet out message, the first OFS forwards the second LLDP packet on the first port according to an instruction of the first instruction encapsulated in the first packet out message, and the connected first TS receives the second LLDP packet, as shown in step 504.

The first TS can obtain device information of the first OFS by parsing the second LLDP packet, for example, the IP address of the first OFS and the port information of the first port of the first OFS. The first TS updates the obtained device information of the first OFS to a remote MIB of the first TS. In this way, the link from the first OFS to the first TS is discovered.

(IV) The OFC Obtains MIB Information of the First TS

Refer to FIG. 5 (*d*). After delivering the first packet out message, the OFC constructs a second packet out message and sends the second packet out message to the first OFS, as shown in step 505. A second instruction is encapsulated in the second packet out message, and the second instruction is used to instruct the first OFS to forward the second packet out message on the first port. A first SNMP get-request message is also encapsulated in the second packet out message, and the first SNMP get-request message is used by the OFC to request to-be-obtained information from the first TS. The to-be-obtained information may be all MIB information of the first TS, or may be only partial MIB information of the first TS. The to-be-obtained information may be in local MIB information of the first TS, or may be in a remote MIB information of the first TS.

A packet out message includes an "ofp_action_type" field used to indicate a task type of the packet out message. In this application, an "ofp_action_type" field in the second packet out message is used to indicate that the second packet out message carries an SNMP get-request message.

In a payload of the second packet out message, a destination MAC address is a MAC address of the second port, connected to an OFS, of the first TS, a source MAC address is the MAC address of the first port of the first OFS, a destination IP address is the IP address of the first TS, and a source IP address is the IP address of the first OFS. In addition, the first SNMP get-request message is also encapsulated in the payload of the second packet out message.

For a specific format of an SNMP message, refer to FIG. 4 (*b*). The SNMP message usually includes two parts: an SNMP header and a protocol data unit (PDU). The SNMP header further includes an SNMP version number and a community name, and the PDU carries a PDU type. A type 0 is used to indicate a get-request message, and a type 2 is used to indicate a get-response.

In this application, a specific instance of the first SNMP get-request message is as follows:
  Version: SNMP version number minus 1
  Community: public
  PDU: type=0, and carrying the MIB information of the first TS that is to be obtained by the OFC, including a local MIB and a remote MIB of the first TS.

After receiving the second packet out message, the first OFS forwards the first SNMP get-request message in the second packet out message on the first port according to the second instruction, and the connected first TS receives the first SNMP get-request message, as shown in step 506.

After receiving the first SNMP get-request message, the first TS searches, based on a requirement of the first SNMP get-request message, the local MIB and the remote MIB of the first TS for an actual value of the information to be obtained by the OFC, encapsulates a search result in a first SNMP get-response message, and returns the first SNMP get-response message to the first OFS, as shown in step 507.

In this application, a specific instance of the first SNMP get-response message is as follows:
  Version: SNMP version number minus 1
  Community: public PDU: type=2, and carrying the MIB information of the first TS, including the actual value, found by the first TS, of the information to be obtained by the OFC.

After receiving the first SNMP get-response message sent by the first TS, the first OFS encapsulates the first SNMP get-response message in its entirety in a second packet in message and reports the second packet in message to the OFC, as shown in step 508. A "reason" field in the second packet in message is used to indicate that the second packet in message is a response message that carries MIB information, to be specific, the second packet in message carries the MIB information of the first TS.

After receiving the second packet in message sent by the first OFS, the OFC can obtain the MIB information of the first TS by parsing the first SNMP get-response message in the second packet in message. The OFC saves, in an IP MIB of the OFC, required content in the obtained MIB information of the first TS, including the device information of the first TS stored in the local MIB information of the first TS, and device information of the second TS, the device information of the first OFS, and/or device information of another traditional switch that are/is stored in the remote MIB information of the first TS.

The OFC can obtain, through calculation based on the obtained MIB information of the first TS, information about a link from the first OFS to the first TS, information about a link from the second TS to the first TS, or information about a link from another traditional switch to the first TS.

It should be pointed out that, in the prior art, SNMP protocol communication between a TS and an OFC is implemented by using a network management system. In one embodiment, an NMA running on the TS directly exchanges an SNMP message with the OFC by using a special control port. In this application, an SNMP protocol message (including an SNMP get-request message, an SNMP get-response message, and the like) between the TS and the OFC is encapsulated in an OpenFlow protocol message for transmission, and therefore does not need to pass through the network management system, nor needs to be forwarded on the special control port. The TS communicates with the OFC according to a normal OpenFlow protocol rule.

(V) The OFC Obtains MIB Information of the Second TS

Refer to FIG. 5 (*e*). After obtaining the MIB information of the first TS, the OFC constructs a third packet out message and sends the third packet out message to the first OFS, as shown in step 509. A third instruction is encapsulated in the third packet out message, and the third instruction is used to instruct the first OFS to forward the first packet out message on the first port. The third packet out message further carries a second SNMP get-request message, and the second SNMP get-request message is used by the OFC to request to-be-obtained information from the second TS. The to-be-obtained information may be all MIB information of the second TS, or may be only partial MIB information of the second TS.

An "ofp_action_type" field in the third packet out message is used to indicate that the third packet out message carries an SNMP get-request message. In a payload of the third packet out message, a destination MAC address is the MAC address of the second port, connected to an OFS, of the first TS, a source MAC address is the MAC address of the first port of the first OFS, a destination IP address is the IP address of the first TS, and a source IP address is the IP address of the first OFS. The second SNMP get-request message is also encapsulated in the payload of the third packet out message. In addition, the payload of the second packet out message further includes a source routing domain field, and the field is filled in with an IP address of the second TS.

In this application, a specific instance of the second SNMP get-request message is as follows:
Version: SNMP version number minus 1
Community: public
PDU: type=0, and carrying information to be obtained by the OFC, including the local MIB and the remote MIB of the second TS.

After receiving the third packet out message, the first OFS forwards the second SNMP get-request message in the third packet out message on the first port according to the third instruction, and the connected first TS receives the second SNMP get-request message, as shown in step 510.

After receiving the second SNMP get-request message, the first TS forwards the second SNMP get-request message to the second TS in a traditional strict source routing manner based on the source routing domain field, as shown in step 511.

After receiving the second SNMP get-request message, the second TS searches, based on a requirement of the second SNMP get-request message, a local MIB and a remote MIB of the second TS for an actual value of the information to be obtained by the OFC, and a search result is partial or all MIB information of the second TS. The second TS encapsulates the search result in a second SNMP get-response message and returns the second SNMP get-response message to the first TS, as shown in step 512.

In this application, a specific instance of the second SNMP get-response message is as follows:
Version: SNMP version number minus 1
Community: public
PDU: type=2, and carrying the MIB information of the second TS, including the actual value, found by the second TS, of the information to be obtained by the OFC.

After receiving the second SNMP get-response message, the first TS forwards the second SNMP get-response message to the first OFS in the traditional strict source routing manner, as shown in step 513. The first OFS encapsulates the second SNMP get-response message in a third packet in message and reports the third packet in message to the OFC, as shown in step 514. A "reason" field in the third packet in message is used to indicate that the third packet in message is a response message that carries MIB information, to be specific, the third packet in message carries the MIB information of the second TS.

After receiving the third packet in message, the OFC can obtain the MIB information of the second TS by parsing the second SNMP get-response message in the third packet in message. The OFC saves, in the IP MIB of the OFC, required content in the MIB information of the second TS, including the device information of the second TS stored in local MIB information of the second TS, and the device information of the first TS, device information of a third TS, and/or device information of another traditional switch that are/is stored in remote MIB information of the second TS.

The OFC can obtain, through calculation based on the obtained MIB information of the second TS, information about a link from the first TS to the second TS, information about a link from the third TS to the second TS, or information about a link from another traditional switch to the second TS.

(VI) The OFC Obtains MIB Information of Another TS

The OFC obtains the MIB information of the another TS based on a similar method of obtaining the MIB information of the second TS in (V), and details are not described herein again. The OFC saves, in the IP MIB of the OFC, required content in the MIB information of the another TS.

The OFC can obtain information about a link between other TSs in the hybrid SDN-IP network based on the MIB information of the another TS.

(VII) Link Discovery Related to OFSs

The OFC may obtain information about a link between OFSs in an existing OpenFlow discovery manner, and details are not described herein. The information about the link between the OFSs is stored in the OpenFlow MIB of the OFC.

By using (I) to (VI), the OFC can obtain information about a link between an OFS and a TS and information about a link between TSs. In addition, based on the information about the link between the OFSs obtained by the OFC in (VII), the OFC can learn of a topology structure of the entire hybrid SDN-IP network.

Figure 6:
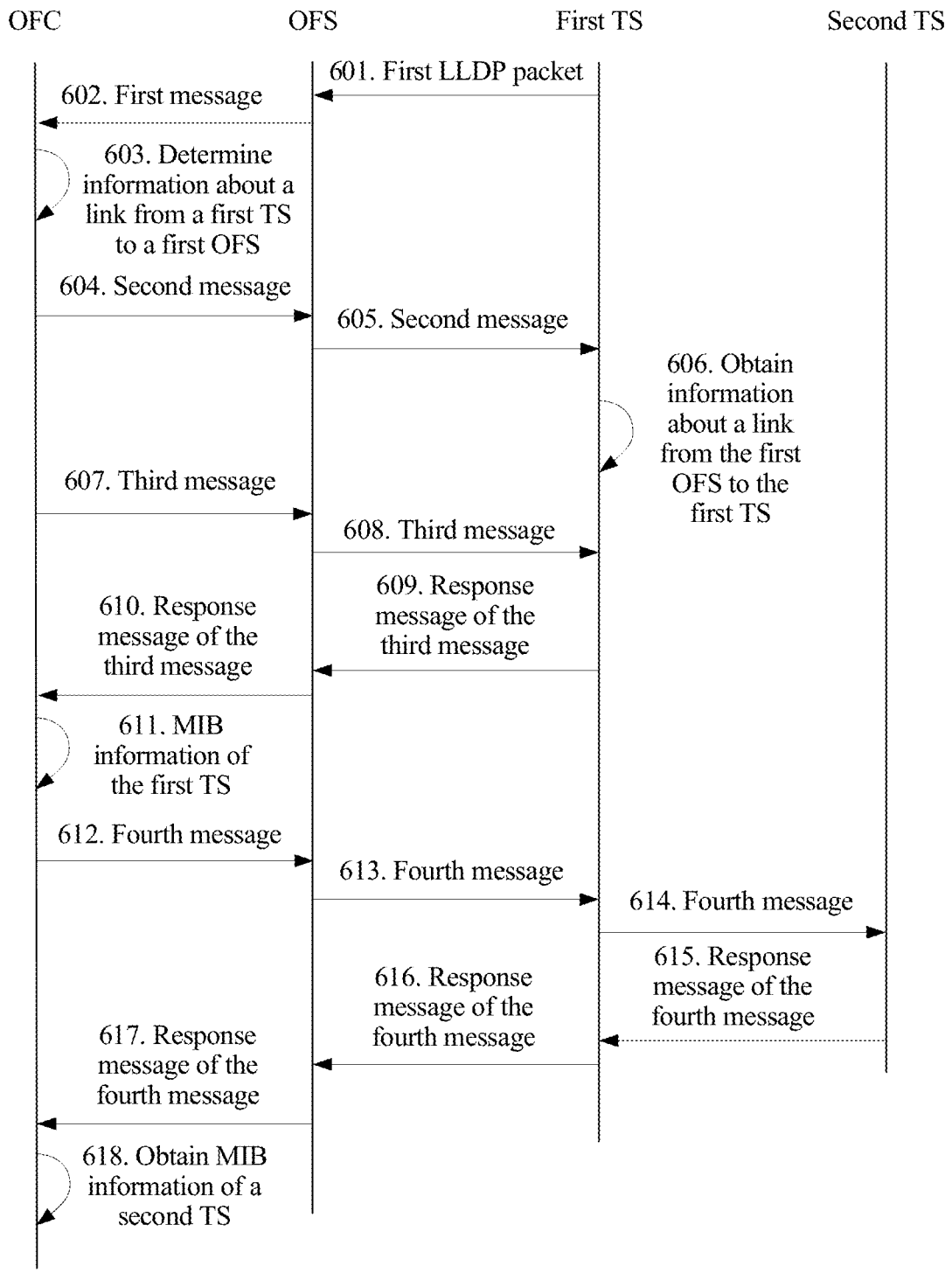
FIG. 6 is a flowchart of a topology determining method according to one embodiment.

According to the principle proposed in (I) to (VI), this application provides a topology determining method. When running, the OFC shown in FIG. 1 and FIG. 2 and a computing device shown in FIGS. 3 (*a*) and 3 (*b*) perform the method. Referring to FIG. 6, a basic procedure of the method includes the following steps.

601. A first OFS receives a first LLDP packet sent by a first TS.

The hybrid SDN-IP network architecture shown in FIG. 1 and FIG. 2 is still used in this embodiment. As described in (I), the first TS sends the first LLDP packet through multicast, and the first LLDP packet is received by the neighboring first OFS. The first LLDP packet carries device information of the first TS, for example, may include identification information of the first TS and port information of a second port, connected to the first OFS, of the first TS.

602. The first OFS sends a first message to the OFC.

After receiving the first LLDP packet, the first OFS encapsulates the first LLDP packet in its entirety in the first message and sends the first message to the OFC, and the OFC receives the first message.

In one embodiment, the first message may be the first packet in message in (II).

603. The OFC determines information about a link from the first TS to the first OFS based on the first message.

As a manager of OFSs in a network, the OFC can learn of information in all aspects of the first OFS, such as device information, address information, and port information. Therefore, after receiving the first message, the OFC can determine the information about the link from the first TS to the first OFS.

In one embodiment, the OFC may save the obtained information about the link from the first TS to the first OFS in an OpenFlow MIB of the OFC.

604. The OFC sends a second message to the first OFS.

The OFC sends the second message to the first OFS, and in one embodiment, the second message may be the first packet out message in (III).

In one embodiment, a second LLDP packet is encapsulated in the second message, and the second LLDP packet carries the device information of the first OFS, for example, may include identification information of the first OFS and information about a first port of the first OFS.

A first instruction is encapsulated in the second message, and is used to instruct the first OFS to forward the second message on the first port. When the device information of the first OFS is carried in the second LLDP packet, the first instruction is specifically used to instruct the first OFS to forward the second LLDP packet on the first port.

605. The first OFS forwards the second message to the first TS.

After receiving the second message, the first OFS forwards the second message on the first port according to an instruction of the first instruction, so that the second message is received by the first TS connected to the first port of the first OFS.

606. The first TS obtains information about a link from the first OFS to the first TS.

The first TS saves, in a remote MIB of the first TS, the device information of the first OFS in the second message, so that the information about the link from the first OFS to the first TS is determined.

607. The OFC sends a third message to the first OFS.

The OFC sends the third message to the first OFS, and the third message is used to request MIB information of the first TS, specifically, may request all MIB information of the first TS, or may request partial MIB information of the first TS. In one embodiment, the third message may be the second packet out message in (IV).

In one embodiment, a first SNMP get-request message may be encapsulated in the third message, and a function of requesting the MIB information of the first TS may be implemented by using the first SNMP get-request message.

A second instruction is encapsulated in the third message, and is used to instruct the first OFS to forward the third message on the first port. When the first SNMP get-request message is encapsulated in the third message, the second instruction is specifically used to instruct the first OFS to forward the first SNMP get-request message on the first port.

Only a network topology shown in FIG. 1 is used as an example for description in this embodiment. However, in one embodiment, in actual application, the second port of the first TS may not be connected to the first OFS, but is connected to a target TS other than the first TS in the hybrid SDN-IP network, such as a seventh TS and an eighth TS. In this case, the OFC may also instruct the target TS to send the third message to the first TS, and this is not limited herein.

608. The first OFS forwards the third message to the first TS.

The first OFS forwards the third message on the first port according to the second instruction, so that the third message is received by the first TS.

609. The first TS returns a response message of the third message to the first OFS.

After receiving the third message, the first TS generates the response message of the third message and returns the response message of the third message to the first OFS. The response message of the third message carries the MIB information of the first TS that may be specifically from a local MIB of the first TS and/or from a remote MIB of the first TS. The response message of the third message may carry all MIB information of the first TS, or may carry partial MIB information of the first TS based on a request of the third message.

In one embodiment, the response message of the third message may be a first SNMP get-response message.

610. The first OFS sends the response message of the third message to the OFC.

The first OFS forwards the response message of the third message to the OFC, and the OFC receives the response message of the third message. In one embodiment, the first OFS may encapsulate the response message of the third message in its entirety in a second packet in message and forward the second packet in message to the OFC.

611. The OFC obtains MIB information of the first TS.

The OFC can obtain the MIB information of the first TS based on the response message of the third message, including the device information of the first TS stored in local MIB information of the first TS, and device information of a second TS, the device information of the first OFS, and/or device information of another traditional switch that are/is stored in remote MIB information of the first TS.

The OFC can obtain, through calculation based on the obtained MIB information of the first TS, the information about the link from the first OFS to the first TS, information about a link from the second TS to the first TS, or information about a link from another traditional switch to the first TS.

In one embodiment, the OFC may save the obtained MIB information of the first TS in an IP MIB of the OFC.

612. The OFC sends a fourth message to the first OFS.

The OFC sends the fourth message to the first OFS, and the fourth message is used to request MIB information of the second TS, specifically, may request all MIB information of the second TS, or may request partial MIB information of the second TS. In one embodiment, the fourth message may be the third packet out message in (V).

In one embodiment, a second SNMP get-request message may be encapsulated in the fourth message, and a function of requesting the MIB information of the second TS may be implemented by using the second SNMP get-request message.

A third instruction is encapsulated in the fourth message, and is used to instruct the first OFS to forward the fourth message on the first port. When the second SNMP get-request message is encapsulated in the fourth message, the third instruction is specifically used to instruct the first OFS to forward the second SNMP get-request message on the first port.

The fourth message further includes a source routing domain field, and the field is filled in with an IP address of the second TS, and is used to instruct the first TS to forward the fourth message to the second TS in a strict source routing manner.

613. The first OFS forwards the fourth message to the first TS.

The first OFS forwards the fourth message on the first port according to the third instruction, so that the fourth message is received by the first TS.

614. The first TS forwards the fourth message to a second TS.

After receiving the fourth message, the first TS forwards the fourth message in the source routing manner based on the source routing domain field in the fourth message, in other words, forwards the fourth message to the second TS.

615. The second TS returns a response message of the fourth message to the first TS.

After receiving the fourth message, the second TS generates the response message of the fourth message and returns the response message of the fourth message to the first TS. The response message of the fourth message carries the MIB information of the second TS that may be specifically from a local MIB of the second TS or from a remote MIB of the second TS. The response message of the fourth message may carry all MIB information of the second TS, or may carry partial MIB information of the second TS based on a request of the fourth message.

The response message of the fourth message further includes a source routing domain field, and the field is filled in with an IP address of the first OFS, and is used to instruct the first TS to forward the response message of the fourth message to the first OFS in the strict source routing manner.

In one embodiment, the response message of the fourth message may be a second SNMP get-response message.

616. The first TS forwards the response message of the fourth message to the first OFS.

The first TS still forwards the response message of the fourth message to the first OFS in the strict source routing manner.

617. The first OFS sends the response message of the fourth message to the OFC.

The first OFS forwards the response message of the fourth message to the OFC, and the OFC receives the response message of the fourth message. In one embodiment, the first OFS may encapsulate the response message of the fourth message in its entirety in a third packet in message and forward the third packet in message to the OFC.

618. The OFC obtains MIB information of the second TS.

The OFC can obtain the MIB information of the second TS based on the response message of the fourth message, including the device information of the second TS stored in local MIB information of the second TS, and the device information of the first TS, device information of a third TS, and/or device information of another traditional switch that are/is stored in remote MIB information of the second TS.

The OFC can obtain, through calculation based on the obtained MIB information of the second TS, information about a link from the first TS to the second TS, information about a link from the third TS to the second TS, or information about a link from another traditional switch to the second TS.

In one embodiment, the OFC may save the obtained MIB information of the second TS in the IP MIB of the OFC.

The OFC may further obtain MIB information of another TS according to a similar method of steps 613 to 618, and details are not described herein again. After the OFC obtains MIB information of all TSs in the hybrid SDN-IP network, the OFC can learn of all information about a link between TSs and all information about a link from an OFS to a TS in the hybrid SDN-IP network. In this way, the OFC obtains a complete topology structure of the hybrid SDN-IP network.

In this embodiment, the OFC in the hybrid SDN-IP network can obtain MIB information of a TS, and obtain information about a link from the OFS to the TS and information about a link between TSs. In this way, the OFC can determine the complete topology structure of the hybrid SDN-IP network, facilitating determining an optimal routing path during subsequent routing calculation.

The embodiments of this application further provide a related OFC and TS, to implement the method described in the foregoing embodiments.

Figure 7:
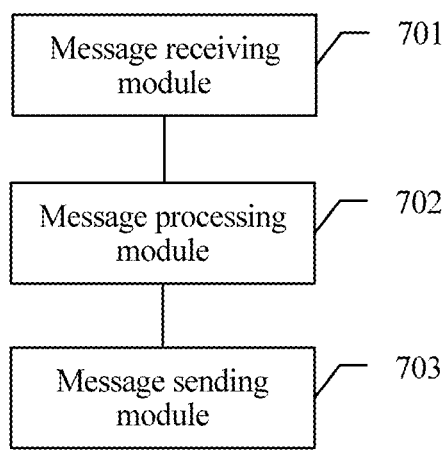
FIG. 7 is a structural diagram of an OFC according to another embodiment.

Referring to FIG. 7, in one embodiment, a basic structure of an OFC includes:

a message receiving module 701 configured to receive a first message forwarded by a first OpenFlow switch OFS, where a first port of the first OFS is connected to a second port of a first TS, the first message is sent by the first TS to the first OFS, and then is forwarded by the first OFS to the OFC; and the first message includes identification information of the first TS and information about the second port;

a message processing module 702 configured to determine information about a link from the first TS to the first OFS based on the first message; and a message sending module 703 configured to send a second message to the first OFS, where the second message includes a first instruction, and the first instruction is used to instruct the first OFS to forward the second message on the first port, so that the first TS obtains information about a link from the first OFS to the first TS.

The message sending module 703 is further configured to send a third message to the first OFS, where the third message is used to request MIB information of the first TS, the third message carries a second instruction, and the second instruction is used to instruct the first OFS to forward the third message on the first port.

The message receiving module 701 is further configured to receive a response message, forwarded by the first OFS, of the third message, where the response message of the third message is sent by the first TS, and the response message of the third message carries the MIB information of the first TS.

The message processing module 702 is further configured to obtain the information about the link from the first OFS to the first TS and information about a link from a second TS to the first TS based on the MIB information of the first TS.

For a specific running method of the OFC in this embodiment, refer to related descriptions in the embodiments shown in FIG. 4 (*a*) to FIG. 6, and details are not described herein again.

Compared with the prior art, the OFC in this embodiment can obtain the MIB information of the first TS, and then obtain, through calculation, information about a link from another device in a network to the first TS based on the MIB information of the first TS, so that the OFC can complete a topology structure of a hybrid SDN-IP network.

The OFC shown in FIG. 7 and the OFC shown in FIG. 3 (*a*) may be a same OFC. The message receiving module 701 and the message sending module 703 in FIG. 7 may be implemented by the communications interface 303 in FIG. 3 (*a*), and the message processing module 702 may be implemented by the processor 301 in FIG. 3 (*a*).

In one embodiment, the MIB information of the first TS includes identification information of the second TS. The message sending module 703 is further configured to send a fourth message to the first OFS, where the fourth message is used to request MIB information of the second TS, the fourth message carries a third instruction used to instruct the first OFS to forward the fourth message on the first port, the fourth message further includes a source routing domain field, and the source routing domain field includes the identification information of the second TS, and is used to instruct the first TS to forward the fourth message to the second TS. The message receiving module 701 is further configured to receive a response message, forwarded by the first OFS, of the fourth message, where the response message of the fourth message is sent by the second TS, and the response message of the fourth message carries the MIB information of the second TS. The message processing module 702 is further configured to obtain information about a link from a third TS to the second TS based on the MIB information of the second TS, where the third TS is connected to the second TS.

In one embodiment, the OFC includes an IP MIB and an OpenFlow MIB, and the message processing module 702 is further configured to: save the MIB information of the first TS and the MIB information of the second TS in the IP MIB of the OFC, and save, in the OpenFlow MIB, the information about the link from the first TS to the first OFS.

In one embodiment, the third message includes a first SNMP get-request message, and the first SNMP get-request message is used to request the management information base MIB information of the first TS. The response message of the third message includes a first SNMP get-response message, and the first SNMP get-response message is used to carry the MIB information of the first TS. The fourth message includes a second SNMP get-request message, and the second SNMP get-request message is used to request the MIB information of the second TS. The response message of the fourth message includes a second SNMP get-response message, and the second SNMP get-response message is used to carry the MIB information of the second TS.

In one embodiment, the response message of the third message is a packet in message in which the first SNMP get-response message is encapsulated, the response message of the third message further includes a reason field, and the reason field in the response message of the third message is used to indicate that the response message of the third message carries the MIB information of the first TS. The response message of the fourth message is a packet in message in which the second SNMP get-response message is encapsulated, the response message of the fourth message further includes a reason field, and the reason field in the response message of the fourth message is used to indicate that the response message of the fourth message carries the MIB information of the second TS.

In one embodiment, a first LLDP packet is encapsulated in the first message, and the first LLDP packet carries the identification information of the first TS and the information about the second port.

Figure 8:
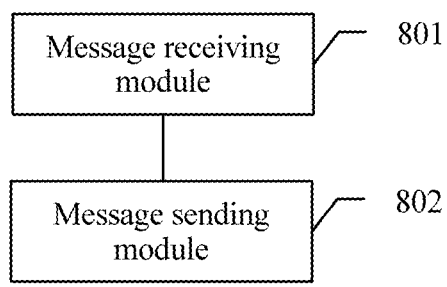
FIG. 8 is a structural diagram of a TS according to another embodiment.

Referring to FIG. 8, a basic structure of a TS is provided according to one embodiment. As a first TS in a hybrid SDN-IP network, a structure of the first TS includes:

a message receiving module 801 configured to receive a third message on a second port of the first TS, where the third message is used by an OFC to request management information base MIB information of the first TS; and a message sending module 802 configured to send a response message of the third message on the second port, where the response message of the third message carries the MIB information of the first TS.

For a specific running method of the TS in this embodiment, refer to related descriptions in the embodiments shown in FIG. 4 (*a*) to FIG. 6, and details are not described herein again.

Compared with the prior art, the TS in this embodiment can feed back the MIB information of the TS to the OFC device, so that the OFC can complete a topology structure of the hybrid SDN-IP network.

The TS shown in FIG. 8 and the TS shown in FIG. 3 (*b*) may be a same TS. The message receiving module 801 and the message sending module 802 in FIG. 8 may be implemented by the communications interface 313 in FIG. 3 (*b*) and controlled by the processor 311 in FIG. 3 (*b*).

In one embodiment, the second port of the first TS is connected to a first port of a first OFS, and the OFC instructs the first OFS to forward the third message on the first port.

In one embodiment, the second port of the first TS is connected to a target TS other than the first TS in the hybrid SDN-IP network, and the OFC instructs the target TS to forward the third message to the first TS.

In one embodiment, the message receiving module 801 is further configured to receive a fourth message on the second port, where the fourth message is used to request MIB information of a second TS, the fourth message includes a source routing domain field, the source routing domain field includes identification information of the second TS, and the second TS is connected to the first TS. The message sending module 802 is further configured to forward the fourth message to the second TS according to an instruction of the source routing domain field. The message receiving module 801 is further configured to receive a response message, returned by the second TS, of the fourth message, where the response message of the fourth message carries the MIB information of the second TS. The message sending module 802 is further configured to send the response message of the fourth message on the second port.

In one embodiment, the third message includes a first SNMP get-request message, and the first SNMP get-request message is used to request the MIB information of the first TS. The response message of the third message includes a first SNMP get-response message, and the first SNMP get-response message is used to carry the MIB information of the first TS. The fourth message includes a second SNMP get-request message, and the second SNMP get-request message is used to request the MIB information of the second TS. The response message of the fourth message includes a second SNMP get-response message, and the second SNMP get-response message is used to carry the MIB information of the second TS.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

The "first" and "second" in this application are merely intended to distinguish different technical features, and do not impose any limitation on the technical features. For example, a "first TS" in this application may also be a "second TS" in actual application.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a Universal Serial Bus (USB) flash drive, a removable hard disk, a read-only memory (ROM), a RAM, a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method of determining a topology, the method being applicable to an OpenFlow controller (OFC) in a hybrid software-defined network (SDN)-Internet Protocol (IP) network, the method comprising:
   receiving a first message forwarded by a first OpenFlow switch (OFS), wherein a first port of the first OFS is connected to a second port of a first traditional switch (TS), the first message is sent by the first TS to the first OFS, and the first message comprises identification information of the first TS and information about the second port;
   determining information about a link from the first TS to the first OFS based on the first message;
   sending a second message to the first OFS, wherein the second message comprises a first instruction used to instruct the first OFS to forward the second message on the first port, so that the first TS obtains information about a link from the first OFS to the first TS;
   sending a third message to the first OFS, wherein the third message is used to request management information base (MIB) information of the first TS, the third message carries a second instruction used to instruct the first OFS to forward the third message on the first port;
   receiving a first response message from the first OFS, wherein the first response message is sent by the first TS to the first OFS after the first TS receives the third message, and the first response message carries the MIB information of the first TS; and
   obtaining, based on the MIB information of the first TS, the information about the link from the first OFS to the first TS and information about a link from a second TS connected to the first TS.

2. The method according to claim 1,
   wherein the MIB information of the first TS comprises identification information of the second TS; and
   further comprising:
   sending a fourth message to the first OFS, wherein the fourth message is used to request MIB information of the second TS, the fourth message carries a third instruction used to instruct the first OFS to forward the fourth message on the first port, the fourth message comprises a source routing domain field, and the source routing domain field comprises the identification information of the second TS, and is used to instruct the first TS to forward the fourth message to the second TS;

receiving a second response message from the first OFS, wherein the second response message is sent by the second TS to the first OFS after the second TS receives the fourth message, and the response message of the fourth message carries the MIB information of the second TS; and obtaining information about a link from a third TS to the second TS based on the MIB information of the second TS, wherein the third TS is connected to the second TS.

3. The method according to claim 2, wherein the OFC comprises an IP MIB and an OpenFlow MIB; and further comprising: saving the MIB information of the first TS and the MIB information of the second TS in the IP MIB of the OFC, and saving, in the OpenFlow MIB, the information about the link from the first TS to the first OFS.

4. The method according to claim 2, wherein the third message comprises a first Simple Network Management Protocol (SNMP) get-request message, and the first SNMP get-request message is used to request the MIB information of the first TS;

the first response message comprises a first SNMP get-response message, and the first SNMP get-response message is used to carry the MIB information of the first TS;

the fourth message comprises a second SNMP get-request message, and the second SNMP get-request message is used to request the MIB information of the second TS; and the second response message comprises a second SNMP get-response message, and the second SNMP get-response message is used to carry the MIB information of the second TS.

5. The method according to claim 4, wherein the first response message is a packet in which the first SNMP get-response message is encapsulated, the first response message further comprises a reason field used to indicate that the first response message carries the MIB information of the first TS; and the second response message is a packet in which the second SNMP get-response message is encapsulated, the second response message further comprises a reason field, and the reason field used to indicate that the second response message carries the MIB information of the second TS.

6. The method according to claim 1, wherein a first Link Layer Discovery Protocol (LLDP) packet is encapsulated in the first message, and the first LLDP packet carries the identification information of the first TS and the information about the second port.

7. A method for message response, the method being applicable to a hybrid software-defined network (SDN)-Internet Protocol (IP) network, wherein the hybrid SDN-IP network comprises an OpenFlow controller (OFC), a first OpenFlow switch (OFS), and at least two traditional switches (TSs), the method comprising:

receiving, by a first TS, a third message on a second port of the first TS, wherein the third message is used by the OFC to request management information base (MIB) information of the first TS; and sending, by the first TS, a first response message on the second port, wherein the first response message carries the MIB information of the first TS.

8. The method according to claim 7, wherein the second port of the first TS is connected to a first port of the first OFS, and the OFC instructs the first OFS to forward the third message on the first port.

9. The method according to claim 7, wherein the second port of the first TS is connected to a target TS other than the first TS in the hybrid SDN-IP network, and the OFC instructs the target TS to forward the third message to the first TS.

10. The method according to claim 7, further comprising:

receiving, by the first TS, a fourth message on the second port, wherein the fourth message is used to request MIB information of a second TS, the fourth message comprises a source routing domain field, the source routing domain field comprises identification information of the second TS, and the second TS is connected to the first TS;

forwarding, by the first TS, the fourth message to the second TS according to an instruction of the source routing domain field; and receiving, by the first TS, a second response message returned by the second TS after the second TS receives the fourth message, and sending the second response message on the second port, wherein the second response message carries the MIB information of the second TS.

11. The method according to claim 7, wherein the third message comprises a first Simple Network Management Protocol (SNMP) get-request message, and the first SNMP get-request message is used to request the MIB information of the first TS;

the first response message comprises a first SNMP get-response message, and the first SNMP get-response message is used to carry the MIB information of the first TS;

the fourth message comprises a second SNMP get-request message, and the second SNMP get-request message is used to request the MIB information of the second TS; and the second response message comprises a second SNMP get-response message, and the second SNMP get-response message is used to carry the MIB information of the second TS.

12. An OpenFlow controller (OFC) applicable to a hybrid software-defined network (SDN)-Internet Protocol (IP) network, the OFC comprising:

a message receiving module configured to receive a first message forwarded by a first OpenFlow switch (OFS), wherein a first port of the first OFS is connected to a second port of a first traditional switch (TS), the first message is sent by the first TS to the first OFS, and the first message comprises identification information of the first TS and information about the second port;

a message processing module configured to determine information about a link from the first TS to the first OFS based on the first message; and a message sending module configured to send a second message to the first OFS, wherein the second message comprises a first instruction used to instruct the first OFS to forward the second message on the first port, so that the first TS obtains information about a link from the first OFS to the first TS, wherein the message sending module is further configured to send a third message to the first OFS, wherein the third message is used to request management information base (MIB) information of the first TS, the third message carries a second instruction used to instruct the first OFS to forward the third message on the first port;

the message receiving module is further configured to receive a first response message from the first OFS, wherein the first response message is sent by the first TS to the first OFS after the first TS receives the third message, and the first response message carries the MIB information of the first TS; and the message processing module is further configured to obtain, based on the MIB information of the first TS, the information about the link from the first OFS to the first TS and information about a link from a second TS connected to the first TS.

13. The OFC according to claim 12, wherein the MIB information of the first TS comprises identification information of the second TS;

the message sending module is further configured to send a fourth message to the first OFS, wherein the fourth message is used to request MIB information of the second TS, the fourth message carries a third instruction used to instruct the first OFS to forward the fourth message on the first port, the fourth message comprises a source routing domain field, and the source routing domain field comprises the identification information of the second TS, and is used to instruct the first TS to forward the fourth message to the second TS;

the message receiving module is further configured to receive a second response message from the first OFS, wherein the second response message is sent by the second TS to the first OFS after the second TS receives the fourth message, and the second response message carries the MIB information of the second TS; and the message processing module is further configured to obtain information about a link from a third TS to the second TS based on the MIB information of the second TS, wherein the third TS is connected to the second TS.

14. The OFC according to claim 13, wherein the OFC comprises an IP MIB and an OpenFlow MIB; and the message processing module is further configured to: save the MIB information of the first TS and the MIB information of the second TS in the IP MIB of the OFC, and save, in the OpenFlow MIB, the information about the link from the first TS to the first OFS.

15. The OFC according to claim 13, wherein the third message comprises a first Simple Network Management Protocol (SNMP) get-request message, and the first SNMP get-request message is used to request the MIB information of the first TS;

the first response message comprises a first SNMP get-response message, and the first SNMP get-response message is used to carry the MIB information of the first TS;

the fourth message comprises a second SNMP get-request message, and the second SNMP get-request message is used to request the MIB information of the second TS; and the second response message comprises a second SNMP get-response message, and the second SNMP get-response message is used to carry the MIB information of the second TS.

16. The OFC according to claim 15, wherein the first response message is a packet in which the first SNMP get-response message is encapsulated, the first response message further comprises a reason field used to indicate that the first response message carries the MIB information of the first TS; and the second response message is a packet in which the second SNMP get-response message is encapsulated, the second response message further comprises a reason field used to indicate that the second response message carries the MIB information of the second TS.

17. The OFC according to claim 12, wherein a first Link Layer Discovery Protocol (LLDP) packet is encapsulated in the first message, and the first LLDP packet carries the identification information of the first TS and the information about the second port.

* * * * *